July 1, 1941.   L. L. STEWART   2,247,969
EDGE GLOW LIGHTING SYSTEM
Filed Dec. 31, 1937   5 Sheets-Sheet 2
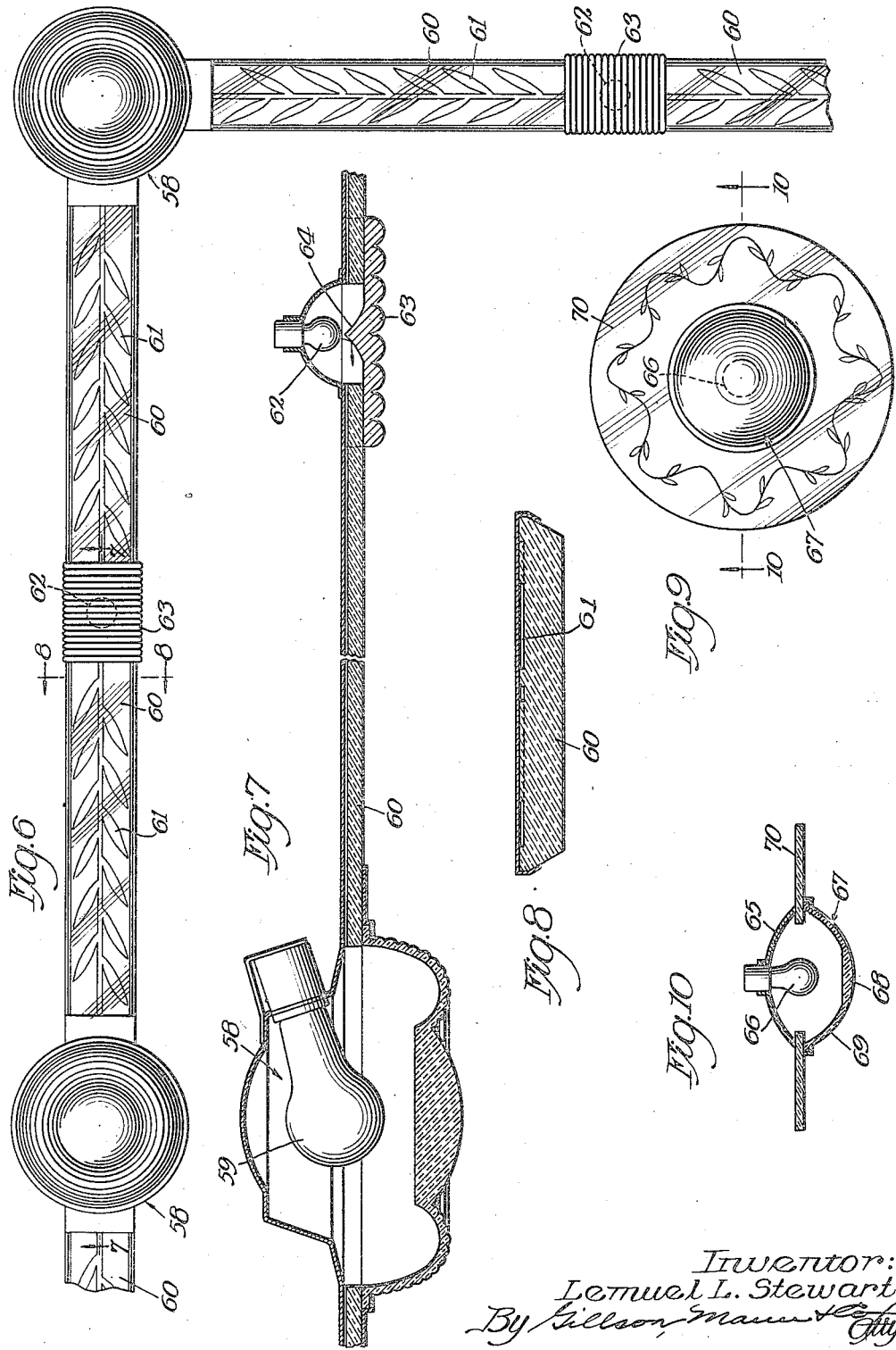
Inventor:
Lemuel L. Stewart

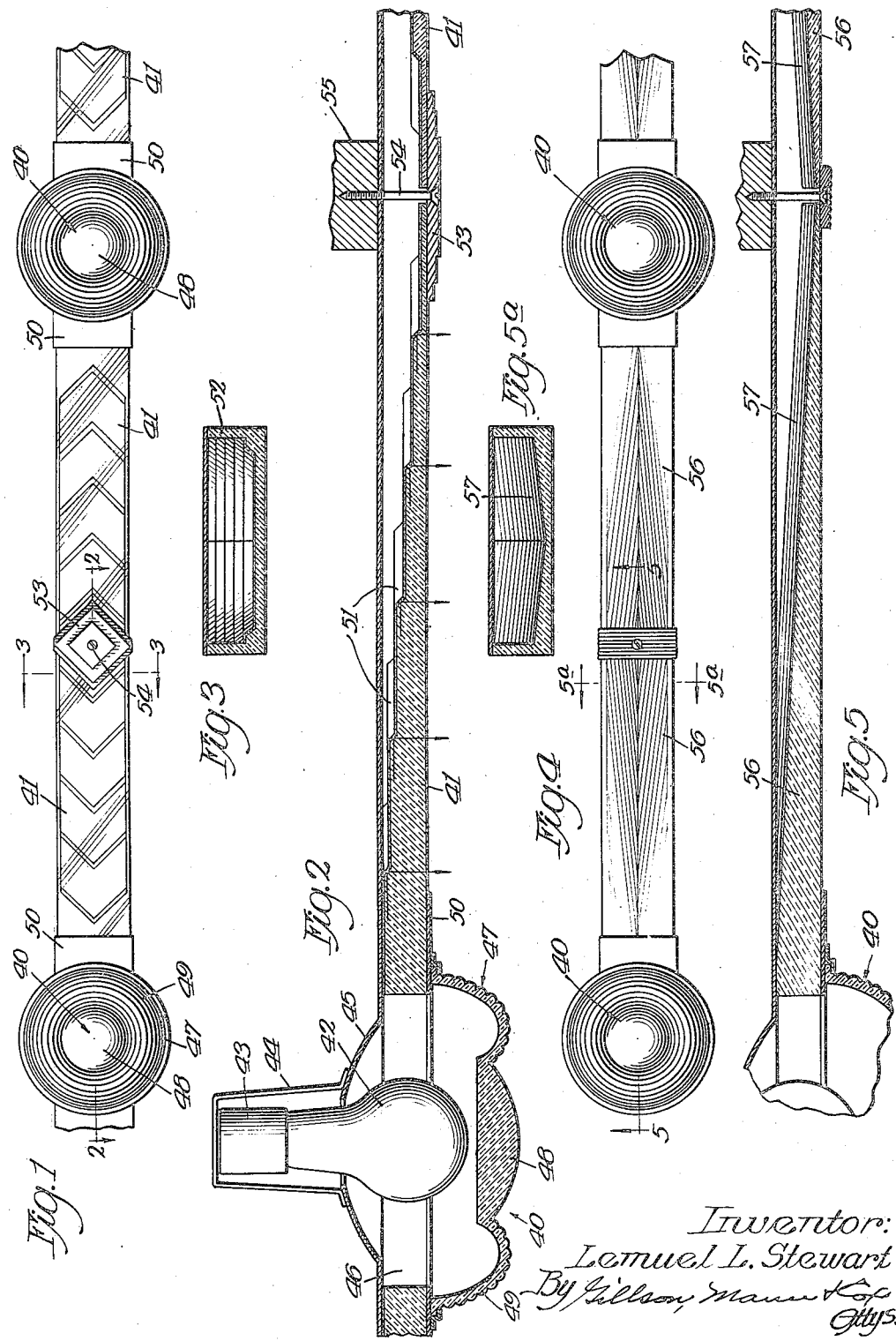

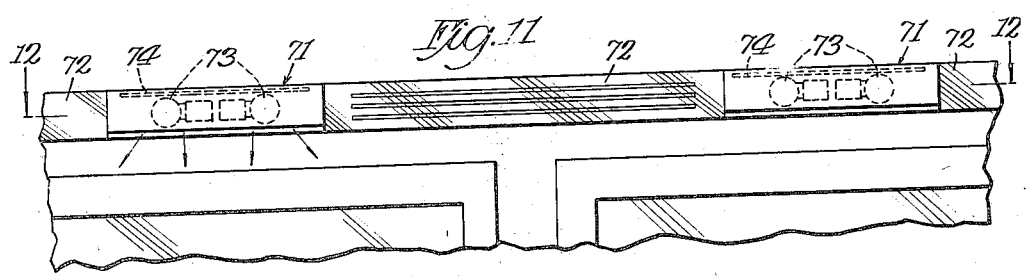
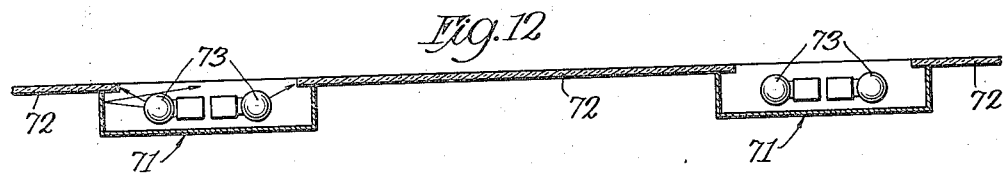
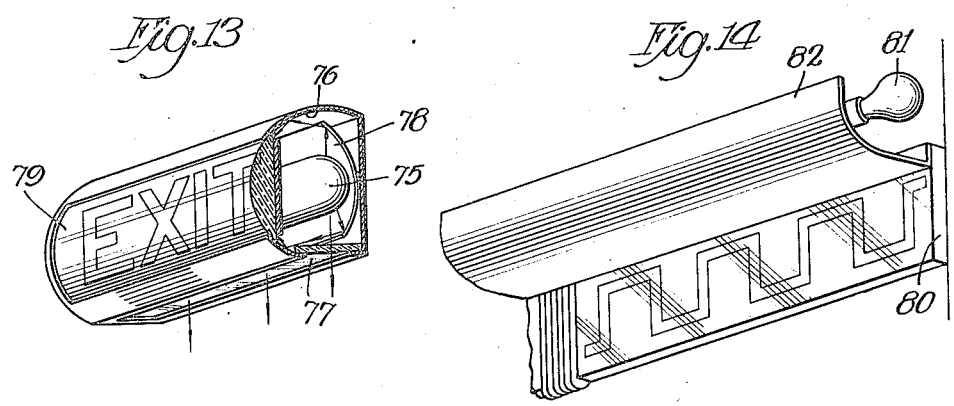
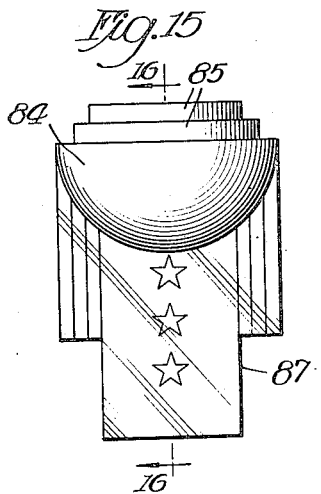
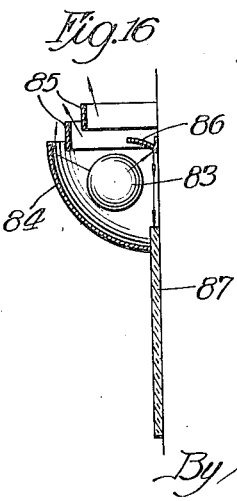

July 1, 1941.   L. L. STEWART   2,247,969
EDGE GLOW LIGHTING SYSTEM
Filed Dec. 31, 1937   5 Sheets-Sheet 4
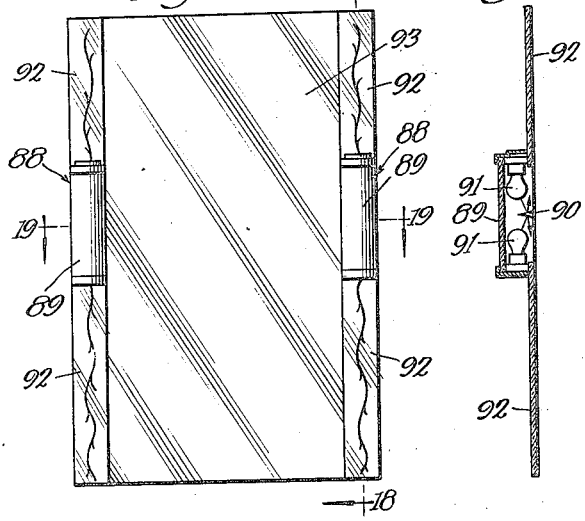
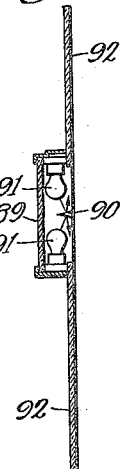
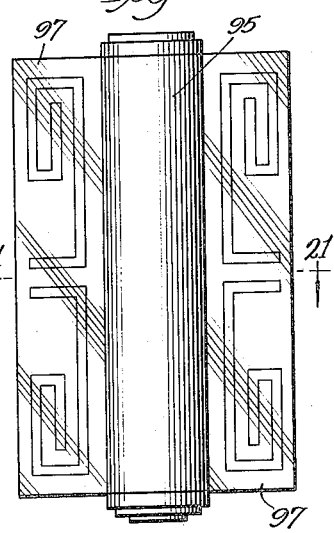
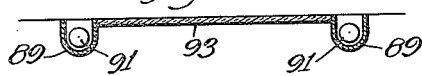
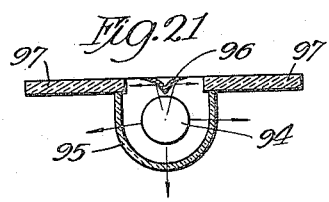
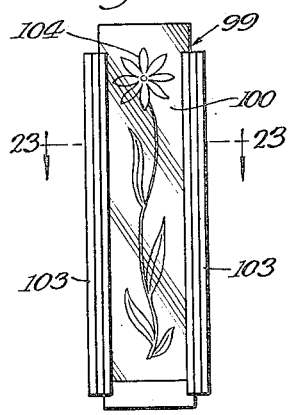
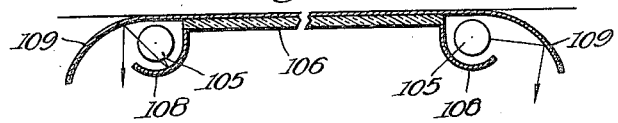
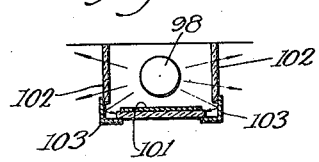
Inventor:
Lemuel L. Stewart
By Gibson, Maun & Ottys
Attys.

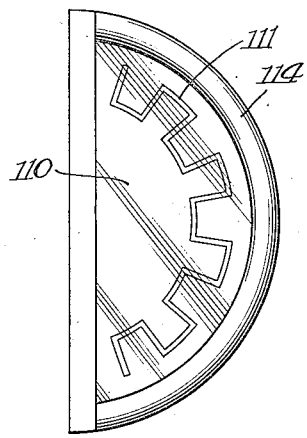
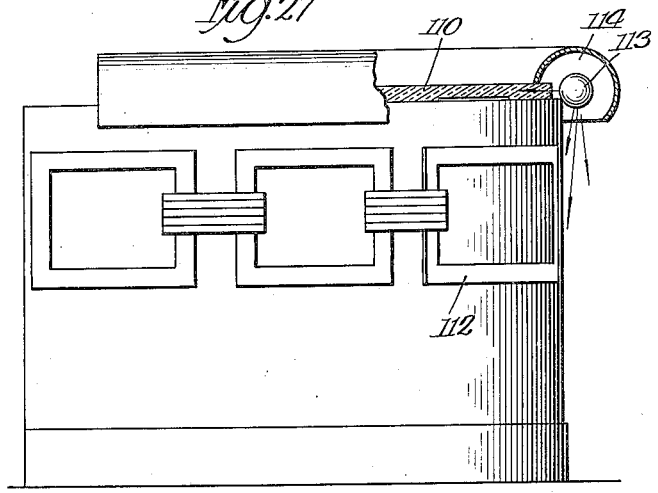
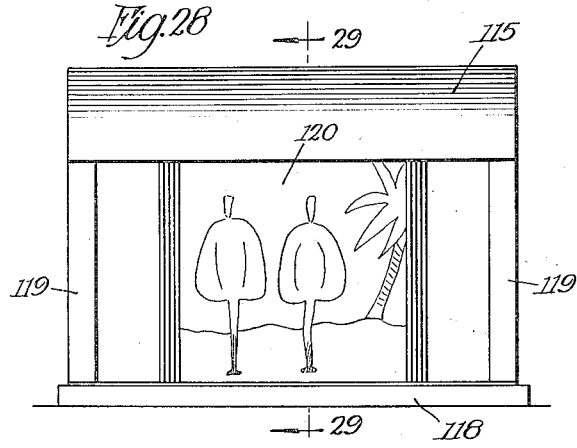
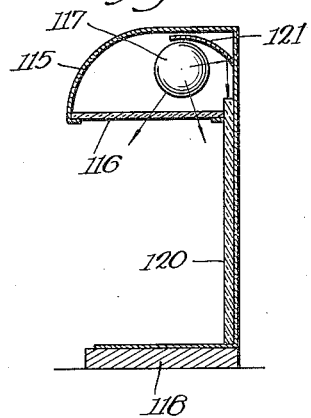
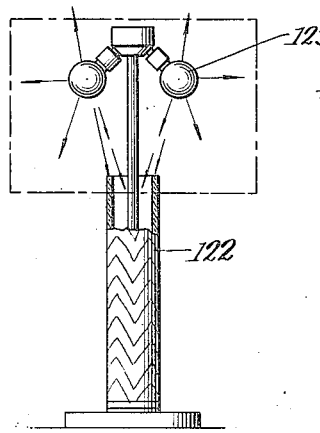

Patented July 1, 1941

2,247,969

UNITED STATES PATENT OFFICE 2,247,969

EDGE GLOW LIGHTING SYSTEM

Lemuel L. Stewart, Elkhart, Ind., assignor to The Adlake Company, a corporation of Illinois Application December 31, 1937, Serial No. 182,860

8 Claims. (Cl. 240—1)

This invention relates to edgeglow lighting which is characterized by the sending of light longitudinally through a pane of glass to give a glowing effect or illuminate a design which has been sand-blasted, or otherwise impressed in the glass. The light source for producing the edgeglow effect is also used to provide some form of direct or indirect lighting for general illumination purposes.

These and other objects and advantages will become apparent as the disclosure proceeds and the description is read in conjunction with the accompanying drawings, in which Fig. 1 shows a lighting system in which a plurality of main lighting units are connected by edgeglow strips;

Figs. 2 and 3 are sectional views taken on the lines 2—2 and 3—3, respectively, of Fig. 1, both Figs. 2 and 3 being in somewhat larger scale than Fig. 1;

Figs. 4, 5 and 5a are corresponding views, respectively, of a modified form of this type of lighting;

Figs. 6, 7 and 8 are similar views showing still another modification of this type of lighting;

Figs. 9 and 10 are bottom plan and sectional views, respectively of a lighting fixture in which a greater part of the light rays are directed downwardly through a glass cover, and other rays are directed laterally into an annular edgeglow ornamental plate;

Fig. 11 shows an adaptation of this invention to a lighting system intended to be used over the windows of a railway car;

Fig. 12 is a horizontal, sectional view taken on the line 12—12 of Fig. 11;

Fig. 13 shows an application of the invention to an exit sign combining direct illumination downward with front edgeglow illumination of the exit sign;

Fig. 14 shows the combination of edgeglow lighting with a cove;

Figs. 15 and 16 are front elevational and vertical sectional views, respectively of a lighting fixture combining edgeglow lighting with upwardly directed louvre lighting;

Fig. 17 shows a modification in which the principles of this invention are applied to the illumination of a mirror and ornamental strips flanking the mirror.

Figs. 18 and 19 are sectional views taken on the lines 18—18 and 19—19, respectively of Fig. 17;

Figs. 20 and 21 show the application of this invention to a vertical tubular fixture, the section in Fig. 21 being taken on the line 21—21 of Fig. 20;

Figs. 22 and 23, the latter being taken on the line 23—23 of Fig. 22, show a fixture in which side illumination is combined with front edgeglow;

Figs. 24 and 25 show a modification of the same principles which are used in the fixture of Figs. 22 and 23;

Figs. 26 and 27 illustrate a circular bar having a glass top with a sand-blasted design which is illuminated by edgeglow effects from a source of light which also illuminates the front of the bar;

Figs. 28 and 29 show an application of this invention to a desk or table lamp;

Fig. 30 illustrates another way in which the principles of this invention may be employed in a desk or table lamp.

The invention may be embodied in a variety of forms as will be apparent from the modifications which are shown in the drawings and will hereafter be described, but the appended claims should not be limited by the specific examples chosen unless required by the prior art.

In Figs. 1-8 inclusive, a lighting system is shown (in several forms) which is particularly suited to the reconstruction and re-modeling of existing railway cars, or other enclosures in which spaced unitary lighting fixtures had previously been used.

Considering, by way of example, a conventional Pullman car having a series of lighting fixtures spaced apart a distance of five or six feet—a very practical and efficient modernization of the lighting system can be effected by substituting for the usual shaded lamp a lighting unit having predetermined light distribution and connecting them with a strip of transparent material, preferably ornamented and made to glow by means of light passed longitudinally through the strip from the main lighting units. The effect of the installation is to remove the disjointed appearance of the old form of lighting and to give the lighting equipment the appearance of a continuous fixture.

A railway car is only one example of a suitable place for the utilization of the fixtures shown in Figs. 1-8, particularly, of the drawings, and obviously the use of the lighting system is not limited to modernization of old equipment, whether it be in a railway car, or some other place.

Referring now to Figs. 1-3 inclusive, a continuous lighting system is shown in which main light units 40 are connected by glass strips 41. In cases where the system is being used to modernize old equipment, the units 40 will be merely substituted for the fixtures previously used, this having the decided advantage that no change of wiring is required.

The main light unit 40 may be of any suitable type, but preferably comprises a lamp 42 mounted in a socket 43 supported on a bracket 44 which is soldered, welded or riveted to a reflector 45, the latter constituting a part of the lamp housing which also includes a cylindrical side wall 46 and a lamp cover 47 which comprises a lens portion 48 and a light diffusing portion 49.

The lens 48 may have any desired optical characteristics, as for example, being shaped to provide with the adjacent lighting units continuous concentrated beam lighting of the aisle. The lamp cover 47 may be modified to incorporate prismatic lenses in place of the lens portion 48 where conditions require.

On opposite sides of each lighting unit 40 are projecting sleeves 50 into which the end of the glass strips 41 extend. The strips 41, though preferably of glass, may also be made of other transparent material, such for example as plastics of which phenol-formaldehyde compounds, urea-formaldehyde compound, methyl-methacrylate resin, cellulose acetate are the most suitable.

The strips 41 in the form of the invention shown in Figs. 1–3 are stepped, the steps in plan being V-shaped for ornamental appearance, although they may have any other desirable shape. The entire back of each strip, including the steps 51 and the side walls 52, is silvered to provide a suitable reflecting surface for light rays travelling longitudinally through the strips from the light source 42. As will be seen from Fig. 2, some light rays will strike the first step and be reflected downwardly, others the second step, and so on, with the result that the edgelow lighting of the strip 41 has a more or less even effect.

In practice, the strip 41 is most readily fabricated by being molded to shape, although other methods of fabrication may, of course, be employed.

The outer ends of the strips 41 are supported by an ornamental plate 53 which is suitably fastened by a screw 54 into a carline 55 or some other suitable frame member.

Obviously, the greatest part of the lumen capacity of the light source is used for the vertical beam emanating from the lens 48 and the general illumination provided through the diffusing portions 49 of the cover 47. The light which travels longitudinally through the edgeglow strips 41 is primarily for ornamentation and to give the effect that the main units 40 are tied together by a part of the lighting system.

The lighting system shown in Figs. 4, 5 and 5a is very similar to the one shown in Figs. 1–3 inclusive, the principal difference being that the edgeglow strips 56 are molded in the form of an inclined V-trough, as indicated at 57. As before, the upper surfaces of the strip are mirrored to reflect the light downwardly although these surfaces may be sand blasted, etched, or otherwise treated to catch the longitudinally travelling light rays and direct them downwardly.

In Figs. 6, 7 and 8, a still further modification of the lighting system is shown, this arrangement being particularly useful in Pullman compartments, or like rooms. The main lighting unit 58 differs in more or less unimportant detail from the main lighting unit 40 in Fig. 1, the principal difference being that the lamp 59 is mounted substantially horizontally instead of vertically.

The edgeglow strip 60 (Figs. 6–8 inclusive), is of the type which has a suitable design, as for example the one indicated at 61, sand blasted, etched, or otherwise impressed in the transparent strip and light travelling from the source longitudinally through the strip illuminates the design and gives a very pleasing effect.

It is convenient to provide a night light 62 behind the ornamental plate 63 which connects adjacent edgeglow strips 61 and a triangular reflector 64 may be employed beneath the lamp 62 to assist in directing light rays longitudinally through the edgeglow strips.

The fixture shown in Figs. 9 and 10 is one which is suitable for ceiling installations, the fixtures comprising a reflector 65 within which a lamp 66 is mounted. The lamp cover 67 preferably has a lens front 68 and the lamp is so placed that light from the source 66 is thrown through the lens 68, a light diffusing portion 69 of the cover, and laterally through an annular plate 70 of ornamental transparent material.

In Figs. 11 and 12, a light box 71 is shown mounted over the windows of a railway car to provide downwardly directed illumination, and the boxes are connected by edgeglow strips 72 suitably ornamented with sand-blasted designs on the rear surface so that light from the lamps 73 will cause them to glow. Preferably, a reflector 74 is mounted over the lamps 73 in the light box to increase the efficiency of the downwardly directed light.

An exit light is shown in Fig. 13 which utilizes similar principles of illumination. Light from a light source 75 is directed downwardly by the top rounded surface 76 of the light box through the glass pane 77 at the bottom of the box and an auxiliary reflector 78 directs some rays of light forwardly to produce edgeglow lighting of the exit sign, the words of which are sand blasted or otherwise impressed in the rear face of the rounded front 79. An opaque backing on the glass 79 confines the lighting of the front to light rays entering the glass along the margin of the backing.

The combination of edgeglow lighting with cove lighting is shown in Fig. 14, in which the ornamental edgeglow strip 80 is mounted on a vertical wall and the light source 81 which provides upwardly directed indirect lighting is mounted behind a curve plate 82.

A special wall fixture is shown in Figs. 15 and 16, in which a light source 83 is mounted in a semi-bowl 84 to direct light upwardly through semicircular louvres 85 for indirect lighting and downwardly with the aid of an auxiliary reflector 86 through edgeglow strip 87 for ornamental edgeglow lighting.

In Figs. 17–19 inclusive, the application of the principles of this invention to illumination on opposite sides of a mirror is shown. The light boxes generally designated 88, have a translucent cylindrical front 89 to provide forward illumination, and a polished metal strip 90 extending transversely across the rear portion of the box serves as a reflecting surface for directing light rays from the lamps 91 through the vertically arranged ornamented edgeglow strips 92 on opposite sides of the mirror 93.

Another type of side wall fixture is shown in Figs. 20 and 21 in which a tubular bulb lamp 94 is mounted in a translucent cylindrical case 95 which provides forwardly directed diffused light and an auxiliary triangular reflector 96 at the rear of the lamp 94 directs light laterally through flanking edgeglow strips 97.

Figs. 22 and 23 illustrate another type of fixture in which a tubular lamp 98 is used for providing direct edgeglow lighting. The lamp is mounted in a vertically extending oblong box 99 which has an ornamented glass front 100 shielded from the direct rays of the light source by an opaque plate 101, and having light emitting side walls 102. The front and side walls of the fixture are joined by metal corners 103 which serve as reflectors to direct rays from the light source laterally through the edgeglow front 100 to cause the sand blasted ornamentation 104 to glow.

In Figs. 24 and 25, still another type of side wall fixture is shown. Here, a pair of vertically positioned tubular lamps 105 are connected by an edgeglow plate 106 which has a suitable design or picture 107 sand-blasted, or otherwise impressed, on the rear surface of the plate. The vertical tubular lamps are hidden from direct view by curved reflector shields 108 which direct light onto other reflector plates 109 which preferably are mat finished to diffuse the light. Obviously a certain amount of light from the lamps 105 will pass laterally through the plate 106 and illuminate the ornamentation 107 impressed on the rear surface of the plate.

A bar front is shown in Figs. 26-27 in which the counter top 110 is made of glass, or other transparent material, and has a suitable design 111 impressed on its under surface. The front of the bar may have suitable decoration, as shown at 112, and this is illuminated by lamps 113 which are placed in an inverted trough 114, forming the margin of the counter top. Light from the lamps 113 passes horizontally through the counter top and illuminates the ornamentation 111.

The desk lamp shown in Figs. 28 and 29 has an elevated light box 115 provided with a light diffusing glass bottom 16 through which light from the lamps 117 is dispersed into the reading or writing plane below. The rear portion of the light box 115 is connected to the base 118 by standards 119 and an ornamented edgeglow plate 120. Light from the lamps 117, partially redirected by an auxiliary reflector 121, passes downwardly through the plate 120 to illuminate the design on the back of the plate.

In Fig. 30, the cylindrical pedestal 122 of a table lamp is fabricated of transparent material having suitable ornamentation sand-blasted, or otherwise impressed in the inner surfaces of the cylinder. The lamps 123 provide not only the ordinary general illumination, but also the edgeglow illumination of the standard 122.

I claim:

1. In a lighting system for a room or the like having a ceiling, a multiplicity of separate, spaced lamp sockets disposed in a horizontal row along said ceiling, a lamp in each of the sockets, a translucent cover member disposed immediately beneath each lamp and adapted to provide general illumination for the room or the like by rays directly transmitted from the adjacent lamp, and means joining adjacent covers to give the system the appearance of a single fixture providing a generally continuous elongated band of light comprising edgeglow strips having ends exposed to the lamps to receive rays therefrom and each having means including a rear surface for reflecting said received rays through the front surface of the strip to supplement the general illumination of the room or the like and render said strip luminous.

2. A system as claimed in claim 1, in which two separate edgeglow strips join adjacent lamp covers, one end of each strip being exposed to a lamp and the other ends of the two strips being lapped over a supporting plate mounted between the lamp sockets and in fixed relation thereto.

3. A system as claimed in claim 1, in which the edgeglow strips are concave in transverse cross section.

4. A system as claimed in claim 1, in which the edgeglow strips are of elongated trough shape and are of substantially V-shape in cross-sectional planes taken transversely through the strips normal to the elongated band.

5. A system as claimed in claim 1, in which the edgeglow strips are concave in transverse cross section and taper from the ends thereof which are exposed to the lamps to a point intermediate a pair of adjacent lamps.

6. A system as claimed in claim 1, in which two separate edgeglow strips join adjacent lamp covers, one end of each strip being relatively thick and exposed to a lamp and the strip tapering therefrom to its opposite end, in combination with means underlapping and supporting the last named ends of said two strips.

7. A system as claimed in claim 1, in which a support is provided for each lamp cover, a reflector is carried by the support for reflecting rays from the lamp through the cover, and the support is provided with an opening receiving and supporting an end of one of the edgeglow strips.

8. A system as claimed in claim 1, in which a support is provided for each lamp cover, a reflector is carried by the support for reflecting rays from the lamp through the cover, and each support between the endmost ones of the system is provided with a pair of opposite openings receiving and supporting the ends of oppositely extending edgeglow strips.

LEMUEL L. STEWART.